(12) United States Patent
Wang

(10) Patent No.: US 7,467,569 B2
(45) Date of Patent: Dec. 23, 2008

(54) DETENT PLUNGER FOR AUTOMATIC TRANSMISSION SHIFTER

(75) Inventor: Yong Qiang Wang, Troy, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 225 days.

(21) Appl. No.: 11/619,723

(22) Filed: Jan. 4, 2007

(65) Prior Publication Data

US 2008/0163714 A1 Jul. 10, 2008

(51) Int. Cl.
*B60K 20/04* (2006.01)
(52) U.S. Cl. ............... 74/473.21; 74/473.25; 74/527
(58) Field of Classification Search ............ 74/473.21, 74/473.25, 473.26, 527; 384/42, 29, 40, 384/38; 403/371, 289, 290, 304, 314, 195, 403/166
See application file for complete search history.

(56) References Cited

U.S. PATENT DOCUMENTS 4,365,522 A * 12/1982 Kubota et al. ............ 74/473.23
7,246,538 B2 * 7/2007 Hermansson ............ 74/473.28

* cited by examiner

*Primary Examiner*—Richard W Ridley
*Assistant Examiner*—Terence Boes
(74) *Attorney, Agent, or Firm*—Richard M. Mescher; Porter, Wright, Morris & Arthur, LLP; Dean B. Watson

(57) ABSTRACT

A shifter mechanism includes a shift lever movable along a shift path and a detent assembly. The detent assembly includes a detent profile defining a plurality of gear positions, a bore, a detent plunger located at least partially within the bore, a spring member resiliently biasing the detent plunger into engagement with the detent profile, a split bushing located between the detent plunger and the bore, and a spacer located between the spring member and the bushing. The bushing is located between the spacer and an abutment of the detent plunger, and the spring member is located between the spacer and an abutment of the bore. Contact surfaces between the bushing and the abutment and between the bushing and the spacer are each angled so that a force of the spring member automatically expands the bushing to remove any free-play formed between the detent plunger and the bore.

18 Claims, 4 Drawing Sheets

DETENT PLUNGER FOR AUTOMATIC TRANSMISSION SHIFTER

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a shifter mechanism for controlling transmissions of motor vehicles, and more specifically, to a detent assembly for such a shifter mechanism.

BACKGROUND OF THE INVENTION

In a vehicle equipped with an automatic transmission, a shifter mechanism typically includes a shift lever pivotable over a series of positions representative of desired transmission gears such as, for example, park (P), reverse (R), neutral (N), drive (D), and low gears (1, 2). The shifter mechanism is connected to the motor vehicle automatic transmission by a suitable mechanical and/or electronic operating linkage to effect actuation of the transmission to the selected gear when the shift lever is pivoted to the transmission gear's representative position. The shifter mechanism is typically provided with a detent assembly which releasably holds the shift lever in a desired gear position to prevent inadvertent movement of the shift lever to other positions but to permit desired movement of the shift lever to other positions. The detent assembly typically includes a mechanical or electrical actuator which is operated to release the detent assembly and permit manual pivoting of the shift lever to a new gear position.

Shifter mechanisms also often have a secondary detent assembly that creates a centering position for the shifter lever at each position so that the shifter lever is precisely located in a desired location for the position and/or provides a desired "tactile" feel to the operator as the operator moves the shifter lever through the gear positions so that the operator can feel each position as the shifter lever is moved. One type of secondary detent assembly includes a detent plunger that is located in a bore. The detent plunger is spring biased so that a free end engages a detent profile which defines the gear positions. When the shift lever is moved from one gear position to another, the free end of the plunger slides along the detent profile, causing the plunger to slide into and out of the bore, creating shifting effort or detent feel (also called artificial feel).

While these prior detent plungers may suitably perform their intended purpose, the operator can get an imprecise shift feel if free-play or lash between the plunger and the plunger housing is too excessive due to manufacturing tolerances or wear. Additionally, there is a never ending desire in the motor vehicle industry to reduce package size, weight and cost. Accordingly, there is a need in the art for an improved detent plunger for a motor vehicle shifter mechanism.

SUMMARY OF THE INVENTION

The present invention provides a shifter mechanism which overcomes at least some of the above-noted problems of the related art. According to the present invention, a shifter mechanism comprises, in combination, a shift lever movable along a shift path having a plurality of gear positions, a detent profile defining the plurality of gear positions, a bore, a detent plunger located at least partially within the bore, a spring member resiliently biasing the detent plunger into engagement with the detent profile, and an expandable bushing located between the detent plunger and the bore. The expandable bushing expands to remove free-play formed between the detent plunger and the bore.

According to another aspect of the present invention, a shifter mechanism comprises, in combination, a shift lever movable along a shift path having a plurality of gear positions, a primary detent assembly that selectively locks the shift lever in one of the plurality of gear positions, and a secondary detent assembly. The secondary detent assembly comprises a secondary detent profile defining the plurality of gear positions, a bore, a detent plunger located at least partially within the bore, a spring member resiliently biasing the detent plunger into engagement with the detent profile, and an expandable bushing located between the detent plunger and the bore. The detent plunger engages the secondary detent profile and moves along the secondary detent profile as the shift lever moves along the shift path. The expandable bushing expands to remove free-play formed between the detent plunger and the bore.

According to yet another aspect of the present invention, a shifter mechanism comprises, in combination, a shift lever movable along a shift path having a plurality of gear positions, a primary detent assembly that selectively locks the shift lever in one of the plurality of gear positions, and a secondary detent assembly. The secondary detent assembly comprises a secondary detent profile defining the plurality of gear positions, a bore, a detent plunger located at least partially within the bore, a spring member resiliently biasing the detent plunger into engagement with the detent profile, a split bushing located between the detent plunger and the bore; and a spacer located between the spring member and the split bushing. The split bushing is located between the spacer and an abutment of the detent plunger, and the spring member is located between the spacer and an abutment of the bore. Contact surfaces between the split bushing and the abutment of the detent plunger and contact surfaces between the split bushing and the spacer are each angled so that a force of the spring member expands the split bushing. The detent plunger engages the secondary detent profile and moves along the secondary detent profile as the shift lever moves along the shift path. The split bushing automatically expands to remove free-play formed between the detent plunger and the bore.

From the foregoing disclosure and the following more detailed description of various preferred embodiments it will be apparent to those skilled in the art that the present invention provides a significant advance in the technology and art of motor vehicle shifter mechanisms. Particularly significant in this regard is the potential the invention affords for providing a high quality, reliable, low cost, mechanism having a lash-free secondary detent plunger. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
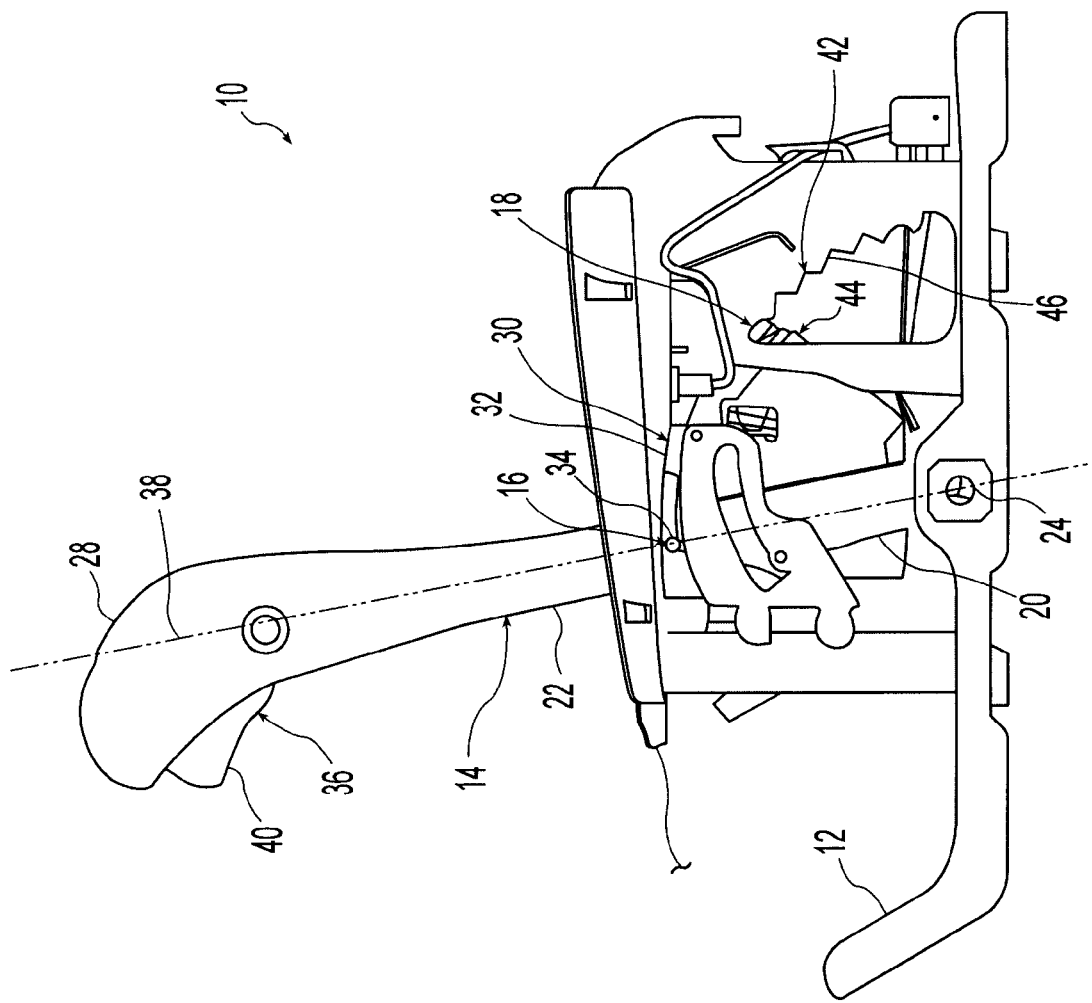
FIG. 1 is a side elevational view of a shifter mechanism according to a preferred embodiment of the present invention.
Figure 2:
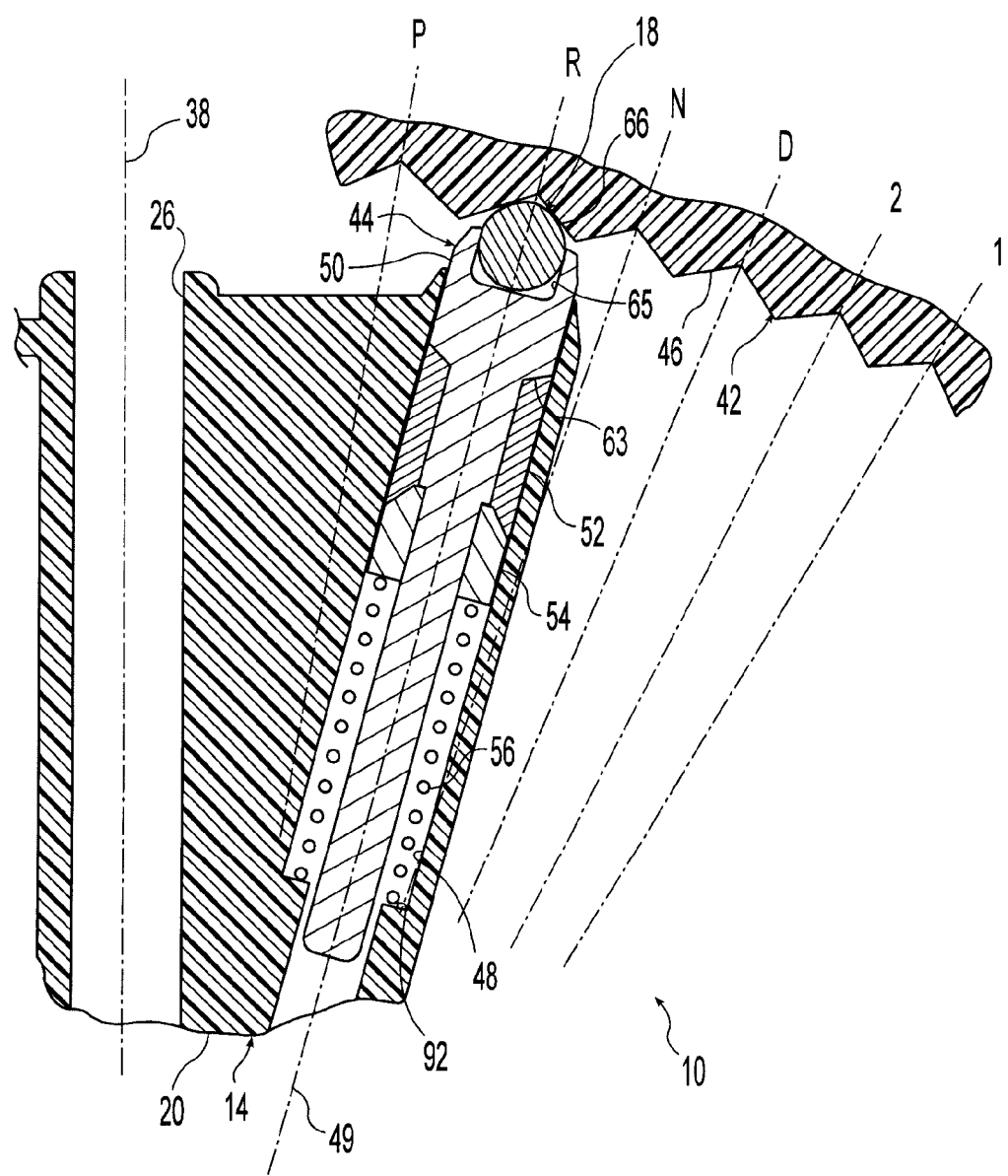
FIG. 2 is an enlarged, fragmented elevational view, in cross-section, of a secondary detent assembly of the shifter mechanism of FIG. 1, wherein some components are removed for clarity.
Figure 3:
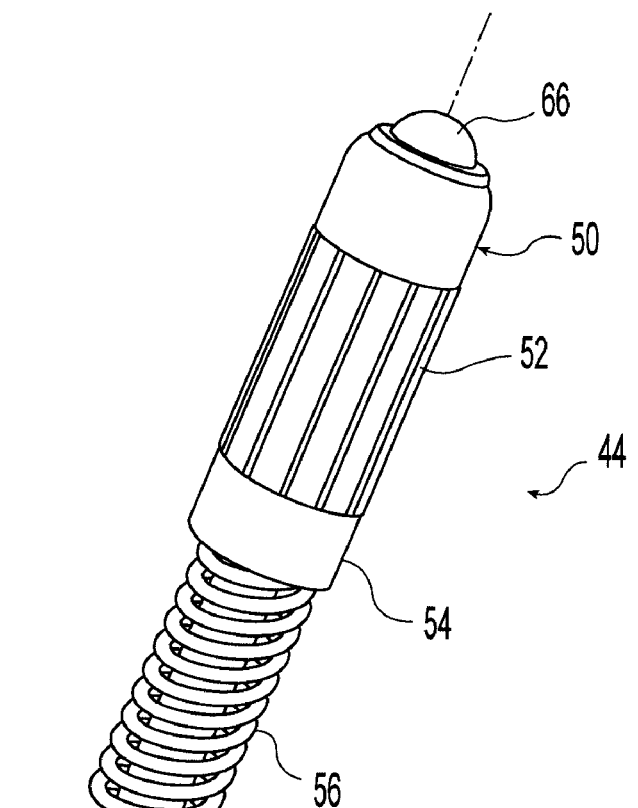
FIG. 3 is a perspective view of a detent plunger subassembly of the secondary detent assembly of FIG. 2.
Figure 4:
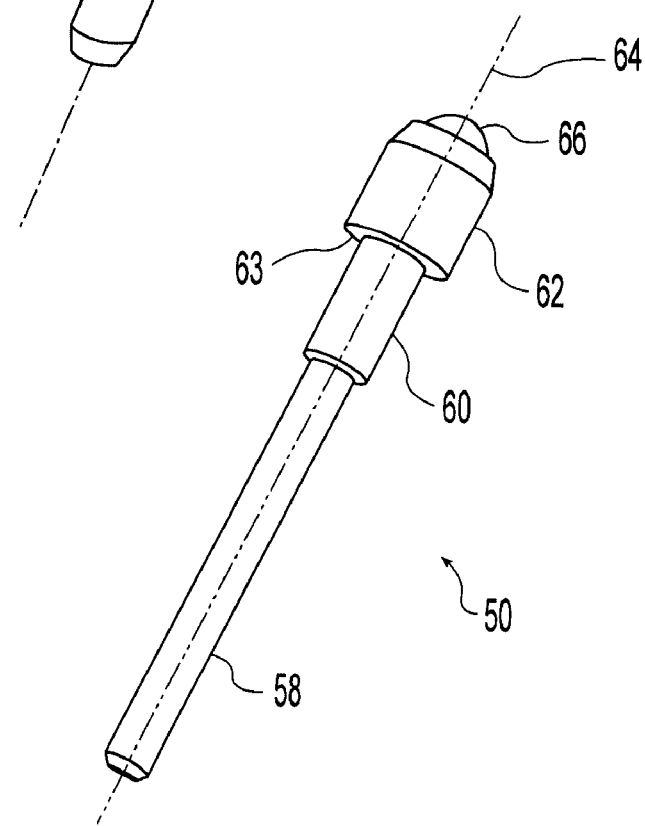
FIG. 4 is a perspective view of a detent plunger of the detent plunger subassembly of FIG. 3.
Figure 5:
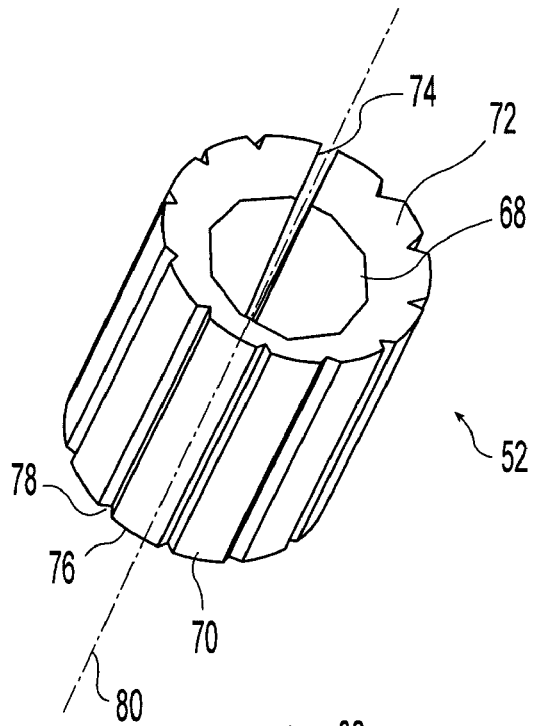
FIG. 5 is perspective view of a split bushing of the detent plunger subassembly of FIG. 3.
Figure 6:
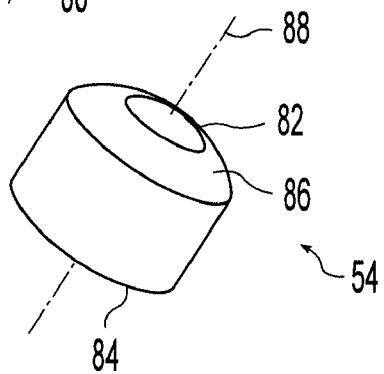
FIG. 6 is perspective view of a back spacer of the detent plunger subassembly of FIG. 3.
Figure 7:
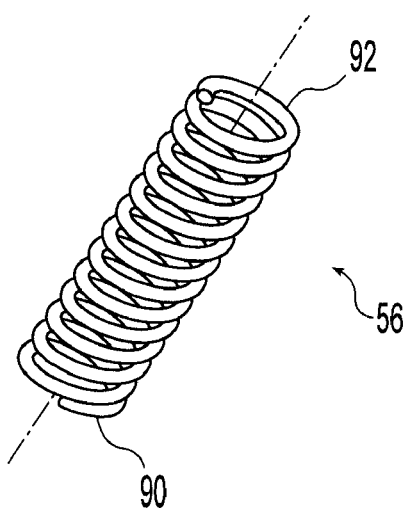
FIG. 7 is perspective view of a spring member of the detent plunger subassembly of FIG. 3.

It should be understood that the appended drawings are not necessarily to scale, presenting a somewhat simplified representation of various preferred features illustrative of the basic principles of the invention. The specific design features of the shifter mechanism as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the shifter mechanism illustrated in the drawings. In general, up or upward generally refers to an upward direction within the plane of the paper in FIG. 1 and down or downward generally refers to a downward direction within the plane of the paper in FIG. 1. Also in general, fore or forward refers to a direction toward the front of the motor vehicle, that is, generally toward the left within the plane of the paper in FIG. 1 and aft or rearward refers to a direction toward the rear of the motor vehicle, that is, generally toward the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved shifter mechanism disclosed herein. The following detailed discussion of various alternative and preferred embodiments will illustrate the general principles of the invention with reference to an automatic transmission shifter mechanism for a motor vehicle such as, for example an automobile, truck, van, cross over vehicle, sport utility vehicle (SUV), recreational vehicle, trailer, off road vehicle such as a dune buggy, industrial or construction equipment, golf cart, or the like. Other embodiments suitable for other applications will be apparent to those skilled in the art given the benefit of this disclosure.

Referring now to the drawings, FIG. 1 shows a shifter mechanism 10 according to a preferred embodiment of the present invention. The illustrated shifter mechanism 10 includes a frame or base 12, a shift lever assembly 14 pivotably mounted to the base 12, a lock or primary detent assembly 16 releasably holding or locking the shift lever assembly 14 in a desired one of a plurality of gear positions against undesired or inadvertent movement to the other gear positions, and a secondary detent assembly 18 centering the shift lever assembly 14 at the gear positions and/or providing tactile feel to the operator when selectively moving the shift lever assembly 14 between the plurality of gear positions.

The base 12 is adapted to be attached to the motor vehicle in a fixed position such as a floor or console and can be formed of any suitable size and shape. The illustrated base 12 is shaped to engage the motor vehicle and support the various components of the shifter mechanism 10 in a desired manner. The illustrated base 12 is provided with openings or holes for receiving mechanical fasteners such as bolts to secure the base 12 to the motor vehicle. Other suitable shapes for the base 12 and the attachment means will be apparent to those skilled in the art. The base 12 can be formed of any suitable material such as, for example, plastic and can be produced by any desirable method such as molding. Preferably, the base 12 is formed of unitary or one-piece construction but alternatively can be constructed of multiple components secured together.

The illustrated shift lever assembly 14 includes a shifter yoke 20 and a shift post or lever 22 upwardly extending from the shifter yoke 20 for manually moving the shifter yoke 20 to change the gear of the transmission. The illustrated shifter yoke 20 is pivotably secured to the base 12 such that it is pivotable about a horizontal and laterally extending pivot axis 24 so that the shift lever assembly 14 can pivot along a path to move between the gear positions. The shifter yoke 20 is adapted for interacting with the primary detent assembly 16 to selectively release the shift lever assembly 14 from the previous gear position and maintain the shift lever assembly 14 in the desired gear position as described in more detail hereinafter. The shifter yoke 20 is also adapted for interacting with the secondary detent assembly 18 for providing a desired tactile feel while moving to a desired gear position as described in more detail hereinafter. The shifter yoke 20 can be formed of any suitable material such as, for example, plastic and can be produced by any desirable method such as molding. Preferably, the shifter yoke 20 is formed of unitary or one-piece construction but alternatively can be constructed of multiple components secured together.

The illustrated shift lever 22 is generally an elongate tube. The lower end of the shift lever 22 is adapted to extend into an opening or bore 26 near a forward end of the shifter yoke 20. A central longitudinal axis of the illustrated bore 26 is substantially perpendicular to and intersects the lateral pivot axis 24. The shift lever 22 can be rigidly secured to the shifter yoke 20 in any suitable manner such as, for example, snap-connectors, welding, adhesives, or mechanical fasteners or the shift lever can be formed unitary, that is as one piece, with the shifter yoke 20. With the shift lever 22 rigidly secured to shifter yoke 20, the shifter yoke 20 can be selectively pivoted about the lateral pivot axis 24 by manually applying a forward or rearward force to the shift lever 22. The upper end of the shift lever 22 is preferably provided with handle or knob 28 sized and shaped for grasping by the operator.

The illustrated primary detent assembly 16 includes a primary detent plate forming a gate or detent profile 30. The illustrated detent plate 29 is vertically disposed with the detent profile 30 formed on a lower edge thereof. The illustrated gate 30 has a plurality of downward facing discontinuities in the form of grooves or notches 32 formed therein. The notches 32 correspond with the various gear positions in which the shift lever assembly 14 can be shifted to provide a desired gear at the transmission of the motor vehicle. The notches 32 can indicate positions such as, for example, park (P), reverse (R), neutral (N), drive (D), and low gears (1, 2). The shift lever assembly 14 is suitably connected, either mechanically and/or electrically, to the transmission of the motor vehicle such that movement the shift lever assembly 14 to the various positions causes the transmission to move to the corresponding gear. The notches 32 are sized and shaped to cooperate with a detent member or gate pin 34 to limit movement in a known manner, that is, to releasably hold the shift lever assembly 14 in a desired gear position. The illustrated notches 32 are each rectangular shaped and are sized differently in order to control movement of the shift lever assembly 14 in a desired manner. It is noted that the notches 32 can alternatively have other suitable shapes such as, for example, arcuate and/or can each be sized the same.

An actuator 36 is provided for selectively moving the gate pin 34 into and out of engagement with the notches 32. The illustrated actuator 36 and gate pin 34 are secured to the shift lever assembly 14 for movement therewith relative to the stationary notches 32 of the gate 30, but alternatively the gate 30 and the gate pin 34 can be reversed. The illustrated gate pin 34 is linearly moved by the actuator 36 along a linear path extending toward and away from the notches 32, that is, in a direction substantially perpendicular to the notches 32. The illustrated gate pin 34 moves along the central longitudinal axis 38 of the shift lever assembly 14 and intersects the pivot axis 24. The gate pin 34 is sized and shaped to cooperate with the notches 32 of the gate 30 so that the gate pin 34 blocks and limits pivotal movement of the shift lever assembly 14 when the gate pin 34 is in one of the notches 32 but permits pivotal movement of the shift lever assembly 14 when the gate pin 34 is removed from the notch 32.

The illustrated actuator 36 includes a manually operated button member 40 and a connecting member or rod extending from the button member 40 to the gate pin 34. The illustrated button member 40 is pivotably secured to the knob 28 and is provided with an engagement surface sized and shaped for interacting with the connecting rod. The illustrated connecting rod extends within the interior passage of the shift lever 22 and is linearly movable along the central axis 38 of the shift lever 22. The lower end of the connecting rod is secured to the gate pin 34. The upper end of the connecting rod is sized and shaped to interact with the button member 40 so that manual actuation of the button member 40 in a direction into the knob 28 linearly and downwardly moves the connecting rod and the gate pin 34 connected thereto toward the pivot axis 24 and away from the notches 32. A spring member is preferably provided within the shift lever 22 to resiliently bias the connecting rod in an upward direction so that the gate pin 34 is resiliently biased toward the notches 32. It is noted that the actuator 36 can alternatively be of any other suitable type such as, for example, an electric linear actuator with a control switch.

The secondary detent assembly 18 includes a secondary detent plate forming a secondary detent profile 42, and a secondary detent plunger assembly 44 secured to the shift lever assembly 14 for movement therewith and engaging the secondary detent profile 42. It is noted that alternatively the detent profile 42 can be carried by the shift lever assembly 14 and the plunger assembly 44 can be stationary.

An arcuate lower edge of the secondary detent plate forms the secondary detent profile 42. The illustrated secondary detent profile 42 is an inward facing contoured surface formed about the pivot axis 24 by a plurality of radially inward facing grooves or notches 46 formed therein. The grooves 46 correspond with the various gear positions in which the shift lever assembly 14 can be shifted as defined by the gate 30. The grooves 46 can indicate positions such, for example, as park (P), reverse (R), neutral (N), drive (D), and low gears (1, 2). The illustrated secondary detent plate is stationary with the base 12 so that the grooves 46 remain stationary when the shifter yoke 20 is pivoted about the lateral pivot axis 24 relative to the base 12 and are sized and shaped to cooperate with the plunger assembly 44 to provide a desired tactile feel. The illustrated grooves 46 are V-shaped or triangular shaped but is noted that the grooves 46 can alternatively have other suitable shapes such as, for example, arcuate shaped or rectangular or square shaped and can each be shaped differently from one another if desired. It is also noted that the contoured surface of the secondary detent profile 42 can alternatively be formed in other manners such as, for example, spaced apart protrusions and/or can alternatively have any desired shape and size.

The illustrated plunger assembly 44 is secured to the shift yoke 20 so that it moves with the shift lever assembly 14 as the shift lever assembly 14 moves through the gear positions. The illustrated plunger assembly 44 extends into an opening or bore 48 near a rearward end of the shifter yoke 20. A central longitudinal axis 49 of the illustrated bore 48 is substantially perpendicular to and intersects the lateral pivot axis 24 of the shift lever assembly 14. The plunger assembly 44 extends from the bore 48 and resiliently engages the secondary detent profile 42 as described in more detail hereinafter.

As best shown in FIGS. 2 to 7, the illustrated plunger assembly 44 includes a detent plunger 50, an expandable bushing 52, a back or rear spacer 54, and a spring member 56. The illustrated detent plunger 50 is generally elongate and cylindrically shaped having a first or inner portion 58 that is sized and shaped to extend within the bore 48 and receive the back spacer 54 and the spring member 56 thereabout, a second or central portion 60 sized and shaped to receive the expandable bushing 52 thereabout, and a third or outer portion 62 sized and shaped to extend into and out of the bore 48. The third portion 62 has an outer diameter larger than an outer diameter of the second portion 60 to form an inwardly facing abutment 63. The abutment 63 is formed at an acute angle relative to the central axis 64 so that it is concave or frusto-conical-shaped. The abutment 63 is sized and shaped to cooperate with the expandable bushing 52 as described in more detail hereinafter. A free or outer end of the outer portion 62 is sized and shaped closely to cooperate with the grooves 46 of the secondary detent profile 42. The illustrated free or outer end of the outer portion 62 is provided with a recess 65 sized and shaped for holding a steel ball 66. It is noted that the free end can alternatively have other suitable shapes and the ball 66 can be eliminated or the ball 66 can be replaced with a roller or the like. The detent plunger 50 can be formed of any suitable material and can be formed of unitary or one-piece construction or can be constructed of multiple components secured together.

The illustrated expandable bushing 52 is generally tubular shaped having a longitudinally extending inner passage or opening 68 extending between first and second ends 70, 72. The passage 68 is sized and shaped for receiving the central portion 60 of the detent plunger 50 therein. A slot 74 extends from the passage 68 to the outer surface 76 of the bushing 52 for the entire length of the bushing 52 so that the bushing 52 is expandable, that is, the size of the outer diameter of the bushing 52 can be increased. While the illustrated expandable bushing 52 is a split bushing, it is noted that any other suitable type of expandable bushing 52 can alternatively be utilized. The illustrated outer surface 76 is provided with a plurality of longitudinally extending and circumferentially spaced apart grooves 78. The grooves 78 are generally equally spaced apart so that outer diameter of the bushing 52 expands generally evenly. The grooves 78 can also be utilized to contain lubricant if desired. The illustrated grooves 78 are V-shaped or triangularly-shaped in cross-section but any other suitable shape can alternatively be utilized. The first and second ends 70, 72 of the illustrated bushing 52 are each formed at an acute angle relative to the central axis 80 so that they are each concave or frusto-conical-shaped. The first and second ends 70, 72 are sized and shaped to cooperate with the back spacer 54 and the detent plunger abutment 63 respectively as described in more detail hereinafter. The expandable bushing 52 can be formed of any suitable material and is preferably formed of unitary or one-piece construction but can alternatively be constructed of multiple components secured together.

The illustrated back or rear spacer 54 is generally tubular shaped having a longitudinally extending inner passage or opening 82 extending between first and second ends 84, 86. The passage 82 is sized and shaped for receiving the inner portion 58 of the detent plunger 50 therein. The first end 84 of the illustrated back spacer 54 is substantially perpendicular to the central axis 88 so that it is generally flat or planar. The first end 84 is sized and shaped to cooperate with the spring member 56 as described in more detail hereinafter. The second end 86 of the illustrated back spacer 54 is formed at an acute angle relative to the central axis 88 so that it is concave or frusto-conical-shaped. The second end 86 is sized and shaped to cooperate with the expandable bushing 52 as described in more detail hereinafter. The back spacer 54 can be formed of any suitable material and is preferably formed of unitary or one-piece construction but can alternatively be constructed of multiple components secured together.

The illustrated spring member 56 is a coiled compression spring having a first end 90 engaging an outwardly facing abutment 92 within the bore 48 and a second end 94 engaging the first end 84 of the back spacer 54. Secured in this manner, the spring member 56 resiliently biases the free end of the detent plunger 50 in an outward direction and into engagement with the secondary detent profile 42. It is noted that any other suitable type or application of the spring member can alternatively be utilized.

The force provided by the spring member 56 squeezes the expandable bushing 52 between the detent plunger abutment 63 and the back spacer second end 86. The outer diameter of the expandable bushing 52 is increased slightly until it engages the bore 48 due to the angular contact surfaces 63, 70, 72, 86 which wedge the expandable bushing in a radially outward direction. Therefore, any free play or lash between the bore 48 and the plunger assembly 44 is automatically eliminated. The expanding force acting on the bushing 52 is determined by the spring force and the size of angles for the angular contact surfaces 63, 70, 72, 86. If the expanding force is too small, the free play or lash will not be eliminated. If the expanding force is too large, there will be an undesirable amount of friction between the bushing 52 and the bore 48 which may result in undesirably quick wear of the plunger assembly 44.

As the shifter yoke 20 pivots relative to the base 12, the spring member 56 resiliently maintains the ball 66 of the detent plunger 50 in sliding contact with the secondary detent profile 42 as the ball 66 moves along the grooves 46. The spring member 56 resiliently flexes so that detent plunger 50 moves in an axial direction within the bore 48 and the ball 66 of the detent plunger 50 follows the secondary detent profile 42.

It is apparent from the above detailed description of preferred embodiments of the present invention, that the secondary detent assembly 18 automatically eliminates free-play or lash between the plunger assembly 44 and the shifter yoke 20 which is due to manufacturing tolerances or wear. As a result, imprecise shifter lever feel and/or rattle due to excessive free-play or lash is avoided by the shifter mechanism according tot eh present invention. Additionally, the secondary detent assembly 18 provides a relatively small package size, weight and cost.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A shifter mechanism comprising, in combination:
a shift lever movable along a shift path having a plurality of gear positions;
a detent profile defining the plurality of gear positions;
a bore;
a detent plunger located at least partially within the bore;
a spring member resiliently biasing the detent plunger into engagement with the detent profile;
an expandable bushing located between the detent plunger and the bore; a spacer located between the spring member and the expandable bushing; wherein the expandable bushing is located between the spacer and the detent plunger; wherein contact surfaces between the expandable bushing and the spacer are each angled so that a force of the spring member expands the expandable bushing; and
wherein the expandable bushing expands to remove free-play formed between the detent plunger and the bore.

2. The shifter mechanism according to claim 1, wherein the expandable bushing is a split bushing.

3. The shifter mechanism according to claim 1, wherein the expandable bushing has a slot permitting an outer diameter of the bushing to be increased.

4. The shifter mechanism according to claim 1, wherein each end of the expandable bushing is provided with angled contact surfaces for expanding the bushing.

5. The shifter mechanism according to claim 1, wherein an outer surface of the expandable bushing is provided with a plurality of longitudinally extending and circumferentially spaced-apart grooves.

6. The shifter mechanism according to claim 1, wherein the detent plunger engages the detent profile and moves along the detent profile as the shift lever moves along the shift path.

7. The shifter mechanism according to claim 1, wherein the detent profile is a secondary detent profile.

8. The shifter mechanism according to claim 7, further comprising a primary detent assembly that selectively locks the shift lever in one of the plurality of gear positions.

9. The shifter mechanism according to claim 1, wherein the detent profile is stationary and the detent plunger is carried by the shift lever as the shift lever moves along the shift path.

10. A shifter mechanism comprising, in combination:
a shift lever movable along a shift path having a plurality of gear positions;

a primary detent assembly that selectively locks the shift lever in one of the plurality of gear positions;
a secondary detent assembly comprising:
a secondary detent profile defining the plurality of gear positions;
a bore;
a detent plunger located at least partially within the bore;
a spacer located between the spring member and the expandable bushing;
a spring member resiliently biasing the detent plunger into engagement with the detent profile; and
an expandable bushing located between the detent plunger and the bore;
wherein the detent plunger engages the secondary detent profile and moves along the secondary detent profile as the shift lever moves along the shift path; wherein the expandable bushing is located between the spacer and the detent plunger; wherein contact surfaces between the expandable bushing and the spacer are each angled so that a force of the spring member expands the expandable bushing;
wherein the expandable bushing expands to remove free-play formed between the detent plunger and the bore.

11. The shifter mechanism according to claim 10, wherein the expandable bushing is a split bushing.

12. The shifter mechanism according to claim 10, wherein the expandable bushing has a slot permitting and outer diameter of the bushing to be increased.

13. The shifter mechanism according to claim 10, wherein each end of the expandable bushing is provided with angled contact surfaces for expanding the bushing.

14. The shifter mechanism according to claim 10, wherein an outer surface of the expandable bushing is provided with a plurality of longitudinally extending and circumferentially spaced-apart grooves.

15. The shifter mechanism according to claim 10, wherein the secondary detent profile is stationary and the detent plunger is carried by the shift lever as the shift lever moves along the shift path.

16. The shifter mechanism according to claim 10, wherein the spring member is located between the spacer and an abutment of the bore.

17. The shifter mechanism according to claim 10, wherein contact surfaces between the expandable bushing and the detent plunger are each angled so that a force of the spring member expands the expandable bushing.

18. A shifter mechanism comprising, in combination:
a shift lever movable along a shift path having a plurality of gear positions;
a primary detent assembly that selectively locks the shift lever in one of the plurality of gear positions;
a secondary detent assembly comprising:
a secondary detent profile defining the plurality of gear positions;
a bore;
a detent plunger located at least partially within the bore;
a spring member resiliently biasing the detent plunger into engagement with the detent profile;
a split bushing located between the detent plunger and the bore; and
a spacer located between the spring member and the split bushing,
wherein the split bushing is located between the spacer and an abutment of the detent plunger, and the spring member is located between the spacer and an abutment of the bore;
wherein contact surfaces between the split bushing and the abutment of the detent plunger and contact surfaces between the split bushing and the spacer are each angled so that a force of the spring member expands the split bushing;
wherein the detent plunger engages the secondary detent profile and moves along the secondary detent profile as the shift lever moves along the shift path; and
wherein the split bushing automatically expands to remove free-play formed between the detent plunger and the bore.

* * * * *